United States Patent [19]

Hattori et al.

[11] Patent Number: 4,642,077

[45] Date of Patent: Feb. 10, 1987

[54] V-BELT TRANSMISSION APPARATUS

[75] Inventors: Torao Hattori, Wako; Minoru Nishimura, Sagamihara; Masaki Goto, Fujinomiya, all of Japan

[73] Assignees: Honda Giken Kogyo Kabushiki Kaisha; Fukui Sinta Kabushiki Kaisha, both of Tokyo, Japan

[21] Appl. No.: 855,295

[22] Filed: Apr. 24, 1986

[30] Foreign Application Priority Data

Apr. 25, 1985 [JP] Japan .................................. 60-87471

[51] Int. Cl.⁴ .................................................. F16G 1/00
[52] U.S. Cl. ..................................... 474/201; 474/242
[58] Field of Search ................................. 474/201, 242

[56] References Cited

U.S. PATENT DOCUMENTS

| 2,309,648 | 2/1943 | Kelly | 474/242 |
| 4,457,742 | 7/1984 | Hattori et al. | 474/242 X |
| 4,580,998 | 4/1986 | Brown | 474/242 X |

FOREIGN PATENT DOCUMENTS 121350 4/1948 Sweden .................................. 474/242

Primary Examiner—James A. Leppink
Assistant Examiner—Frank H. McKenzie, Jr.
Attorney, Agent, or Firm—Armstrong, Nikaido, Marmelstein & Kubovcik

[57] ABSTRACT

A V-belt transmission apparatus made of a pair of endless metallic belts and a plurality of V-shaped metallic members disposed in series in a stacked condition on the belts. Each V-shaped metallic member has laterally open, channel shaped grooves on both sides with the metallic belt on each side being inserted in the groove on that side. Each V-shaped metallic member includes a main body having a projection portion and a stopper member prepared separately from and attached to the projection portion of the main body. The stopper member forms upper wall portions defining the channel shaped grooves together with the main body.

4 Claims, 10 Drawing Figures

V-BELT TRANSMISSION APPARATUS

BACKGROUND OF THE INVENTION

This invention relates to a V-belt transmission apparatus used for a stepless variable change speed machine for a vehicle or the like. More particularly, the invention is directed to a V-belt transmission apparatus having a large number of V-shaped metallic members disposed in series in stacked condition along on a metallic belt means forming, as a whole, a V-belt assembly, with this assembly being arranged around a driving pulley and a driven pulley so as to enable power transmission between the two pulleys.

A known apparatus of this kind is disclosed in Japanese Patent Application Publication No. Sho 57-58543 and is shown in FIG. 1. Two metallic belts a, a constituting the belt means are disposed laterally in parallel one with another. Each V-shaped member b is provided with laterally open channel-shaped grooves c, c made on both sides thereof. The metallic belt a on each side is inserted in the channel-shaped groove c on each side. It has been usual with such an apparatus that the groove c on each side is formed, by means of blanking or the like, and is defined by a grooved wall surface in an integral part of the metallic member b as shown in FIG. 1.

When the V-shaped metallic member b is engaged with the V-pulley d during an operation, a lower wall surface $c_1$ in each channel-shaped groove c of the V-shaped metallic member b is in strong pressure contact with an inner facing surface of each metallic belt a. When the metallic member b is disengaged from the V-pulley d, the lower wall surface $c_1$ or an upper wall surface $c_2$ in each groove c of the V-shaped metallic member b is in contact with the inner facing surface or an outer facing surface of each metallic belt a. Accordingly, in order to prolong the service life of the belt, it is desirable that these wall surfaces $c_1$, $c_2$ be smoothly finished. It is additionally desirable that the lower wall surface $c_1$ be a curved surface corresponding to a curve of the metallic belt a caused by the engagement thereof with the V-pulley d. Because the channel-shaped groove c is formed in the integral part of the V-shaped metallic member b, the resultant shape of the sidewardly open channel-shaped groove c is narrow in a vertically width thereof (as shown in FIG. 1) and is deep in the depth thereof. Such a construction results in a problem that the finishing work on the wall surfaces $c_1$, $c_2$ is very difficult.

OBJECT AND SUMMARY OF THE INVENTION

This invention has for its object to provide a V-belt transmission apparatus free from this problem.

According to this invention, for achieving the foregoing object, the upper wall portions defining the channel-shaped grooves on both sides of each metallic member and facing the outer surfaces of the metallic belts are formed by a stopper member prepared separately from and attached to a main body of the V-shaped metallic member. The main body of the V-shaped metallic member is open upwards on both sides of a projection portion thereof and is closed with the stopper member for defining the channel-shaped grooves on both sides.

For the foregoing construction, since the main body of the V-shaped metallic member is open upwards on both sides of the projection portion thereof, the conventional defect with the conventional V-shaped metallic member formed integral with upper wall surfaces is eliminated. Thus, any desired working technique such as cutting, grinding or the like can be applied, through the upwardly open spaces, to the lower wall surfaces on both sides thereof. The size of the tool to be used can be selected freely. The lower wall surfaces can be subjected to a finishing technique easily and with high accuracy. Additionally, the main body with the lower wall surfaces on both sides of the projection portion thereof can be easily prepared by using a metallic die.

BRIEF DESCRIPTION OF THE DRAWINGS

The above and other objects and the attendant advantages of the present invention will become readily apparent by reference to the following detailed description when considered in conjunction with the accompanied drawings herein.

DETAILED DESCRIPTION OF PREFERRED EMBODIMENTS

Figure 1:
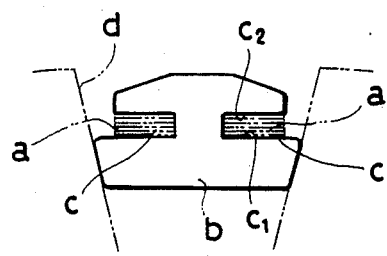
FIG. 1 is a front view of a V-shaped metallic member in a conventional apparatus.
Figure 2:
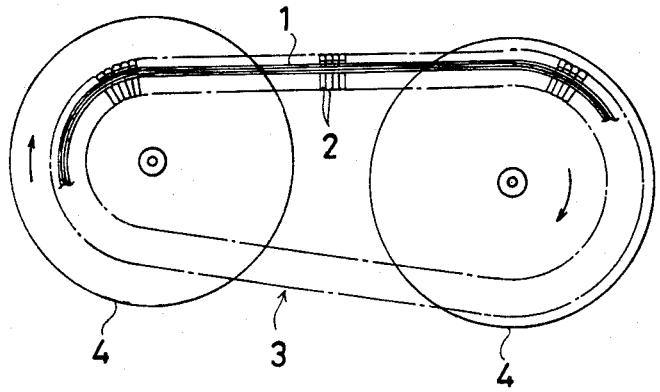
FIG. 2 is a side view showing this invention.

Embodying examples of this invention will be explained with reference to the accompanying drawings:

Referring to FIGS. 2-5 showing one example thereof, an endless metallic belt 1 comprises plural metallic straps put one upon another. A large number of V-shaped metallic members 2 are disposed in series in stacked condition along on a metallic belt means comprising at least two metallic belts 1 so as to form, as a whole, a V-belt assembly 3. This assembly 3 is arranged around V-pulleys 4, 4, one being a driving pulley and the other being a driven pulley so as to enable power transmission between the two pulleys 4, 4.

In the illustrated example, the metallic belt means comprises a pair of metallic belts 1 disposed laterally in parallel one with another. Each V-shaped metallic member 2 is provided with channel-shaped grooves 5, 5 made on both sides thereof open laterally. The metallic belt 1 on each side is inserted in the channel-shaped groove 5 on that side as shown clearly in FIG. 3.

The above construction is not especially different from that of the conventional example. According to this invention, upper wall portions defining the channel-shaped grooves 5, 5 and facing outer surfaces of the metallic belts 1, 1 on both sides are formed by a stopper member 6 which is prepared separately from and attached later to a main body 2a of the V-shaped metallic member 2. The main body 2a of the V-shaped metallic member 2 is previously prepared to be open upwards on both sides of a projection portion 7 thereof so that the upwardly open spaces thereof can be closed with the stopper member 6 for defining the channel-shaped grooves 5, 5 on both sides thereof.

Figure 3:
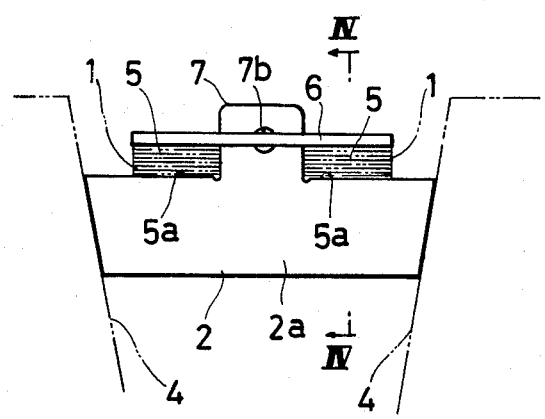
FIG. 3 is a front view of a V-shaped metallic member thereof.

This will be explained more in detail with reference to FIGS. 3-5 as follows:

The main body 2a of the V-shaped metallic member 2 has a basic form lacking laterally extending upper portions formed by the stopper member 6 and is open upwards on both sides of the projection portion 7 protruded from the middle part of the lateral width of a base portion thereof. The surfaces 5a, 5a on each lateral side of the projection portion 7 define the bottom surfaces of the channel-shaped grooves 5, 5 on both sides and are brought into contact with inner surfaces of the metallic belts 1, 1 on both sides. The stopper member 6 prepared separately from the main body 2a is brought into engagement with the projection portion 7 of the main body 2a to complete the V-shaped metallic member 2.

Figure 5:
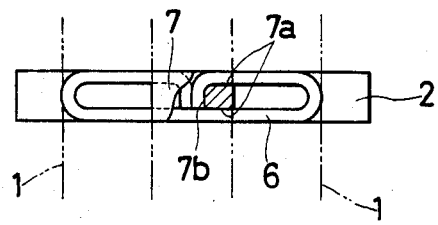
FIG. 5 is a top plan view, partly in section, of the same.

The stopper member 6 can be formed as shown in FIG. 5 of a wire or rod member curved into a loop longitudinally extending laterally of the main body 2a. The opposite free ends of the curved wire or rod member are in abuttment one with another at a middle portion of the loop and are bent inwards. The projection portion 7 is provided with grooves 7a, 7a made in the front and rear surfaces thereof. The looped wire member 6 engages the grooves 7a, 7a. The projection portion 7 has a front to rear oriented hole 7b made therethrough. The opposite free end portions of the looped wire member 6 are inserted in the hole 7b so that the wire type stopper member 6 is immovably set in position vertically (restrained by the front and rear grooves 7a, 7a) and laterally (restrained by the hole 7b).

Figure 4:
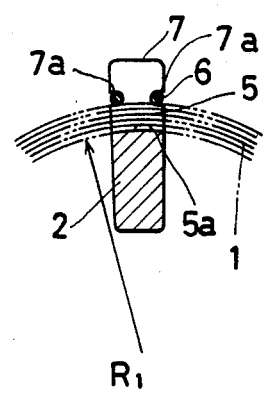
FIG. 4 is a sectional view taken along the line IV—IV in FIG. 3.

Each of the lower wall surfaces 5a, 5a is previously subjected to finishing by a machining technique such as by cutting, grinding or the like so as to be a curved smooth surface which is curved in the front and rear directions with a predetermined curvature $R_1$, as shown in FIG. 4. In this manner, the main body 2a has no upper wall portions which would obstruct the foregoing finishing on the lower wall surface 5a, so that the finishing thereof can be carried out easily and with high accuracy.

Figure 6:
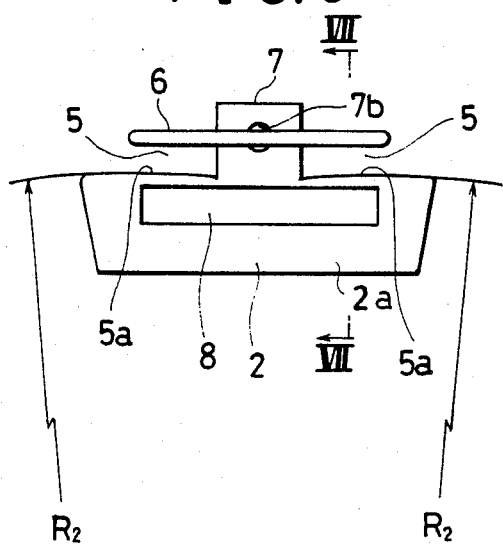
FIG. 6 is a front view of a modified example of the V-shaped metallic member.
Figure 7:
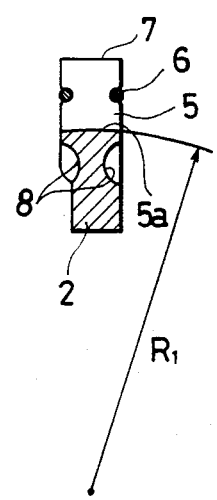
FIG. 7 is a sectional view taken along the line VII—VII in FIG. 6.

FIGS. 6 and 7 show another embodiment of this invention. In this example, the main body 2a of the V-shaped metallic member 2 is made of sintered alloy. The main body 2a having the lower wall surfaces 5a defining the channel-shaped grooves 5 on both sides of the V-shaped metallic chamber 2 can be formed by using a metallic die.

This embodiment has the advantage that the lower wall surfaces 5a can be finished, easily and without any dispersion in shape and size between products, to have curved smooth surfaces that are curved not only in front and rear directions but also in a lateral direction with a predetermined curvature $R_2$.

A V-shaped metallic member 2 having a complicated shape, as a whole, including concave portions 8, 8 made in the front and rear surfaces thereof can be easily produced from a sintered alloy.

Figure 8:
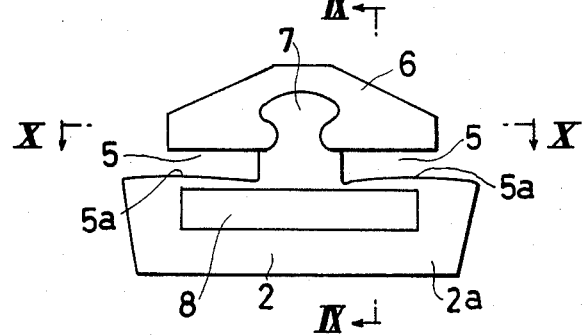
FIG. 8 is a front view of a further modified example of the V-shaped metallic member.
Figure 9:
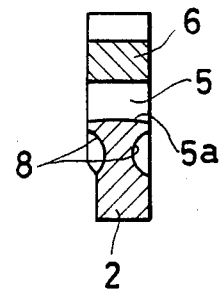
FIGS. 9 and 10 are sectional views taken along the lines IX—IX and X—X in FIG. 8, respectively.
Figure 10:
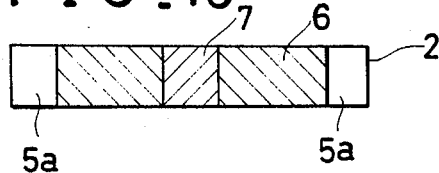

FIGS. 8-10 show a further embodiment of this invention. In this example, the stopper member 6 is formed of a pressed molded material or sintered molded material instead of a wire member, and is attached to the projection portion 7 of the main body 2a by a press-fitting or the like.

If it is intended to use the stopper member 6 of this type, it is necessary that lower surfaces thereof which are to be brought into contact with the metallic belts 1 be finished into smooth surfaces. If, however, the stopper member 6 is the foregoing wire type, finishing becomes unnecessary and the weight of the stopper member 6 becomes lighter.

Thus, according to this invention, the main body of the metallic member is open upwards on both sides of a projection portion thereof, so that the bottom wall surfaces of the main body which are to be brought into contact with the metallic belts can be easily smoothly finished with high accuracy. The service life of the belts can be elongated. In addition, the finishing work on the wall surface can be facilitated, and by simply attaching the stopper member to the main body, there can be manufactured the V-shaped metallic member having channel-shaped grooves open laterally on both sides, so that the manufacturing cost can be decreased.

It is readily apparent that the above-described V-belt transmission apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A V-belt transmission apparatus comprising endless metallic belt means and a plurality of V-shaped metallic members disposed in series in a stacked condition along on said endless metallic belt means, said apparatus being arrangeable around a driving pulley and a driven pulley so as to enable power transmission between the two pulleys; said metallic belt means comprising at least two metallic belts disposed laterally in parallel one with another, each V-shaped metallic member being provided with laterally open, channel-shaped grooves made on both sides thereof, said metallic belt on each side being inserted in the channel-shaped groove on the corresponding side; each V-shaped metallic member comprising a main body having a projection portion, and a stopper member prepared separately from and attached to the main body of the V-shaped metallic member forming upper wall portions defining the channel-shaped grooves on both sides and facing outer surfaces of the metallic belts on both sides, the main body of the V-shaped metallic member being open upwardly on both sides of said projection portion thereof which is closed with the stopper member defining the channel-shaped grooves therebelow on both sides.

2. A V-belt transmission apparatus as claimed in claim 1, wherein said projection portion of the main body of the V-shaped metallic member protrudes from an intermediate part of a lateral width of a base portion of the main body, and the stopper member is a wire member engaged with said projection portion.

3. A V-belt transmission apparatus as claimed in claim 1, wherein the stopper member is a molded member which is attached to the projection portion of the main body of the V-shaped metallic member by press-fit engagement therewith.

4. A V-belt transmission apparatus as claimed in claim 1, wherein the main body of the V-shaped metallic member is made of sintered alloy, and has a lower wall surface on each side of the projection portion thereof which is in contact with an inner facing surface of the corresponding metallic belt, said lower wall surface being a curved surface.

* * * * *